US012781536B2

(12) United States Patent
Su et al.

(10) Patent No.: US 12,781,536 B2
(45) Date of Patent: Nov. 3, 2026

(54) PORTABLE DISMANTLING STRUCTURE FOR SMART DOORBELL

(71) Applicant: Shenzhen Conex Intelligent Technology Co., Ltd, Shenzhen (CN)

(72) Inventors: Zhiyong Su, Ruian (CN); Yueyou Liu, Shaoyang (CN); Yingzhi Yang, Shenzhen (CN)

(73) Assignee: Shenzhen Conex Intelligent Technology Co., Ltd, Shenzhen (CN)

( * ) Notice: Subject to any disclaimer, the term of this patent is extended or adjusted under 35 U.S.C. 154(b) by 453 days.

(21) Appl. No.: 18/328,775

(22) Filed: Jun. 5, 2023

(65) Prior Publication Data

US 2023/0313563 A1 Oct. 5, 2023

(30) Foreign Application Priority Data

Apr. 28, 2023 (CN) ........................ 202310478171.4

(51) Int. Cl.
*E05B 47/00* (2006.01)
*E05C 17/24* (2006.01)
*E05B 65/00* (2006.01)
*G06V 40/12* (2022.01)

(52) U.S. Cl.
CPC .......... *E05B 47/0002* (2013.01); *E05C 17/24* (2013.01); *E05B 2047/0058* (2013.01); *E05B 2047/0073* (2013.01); *E05B 2047/0095* (2013.01); *E05B 65/00* (2013.01); *G06V 40/12* (2022.01)

(58) Field of Classification Search
CPC .... E05B 49/008; E05B 47/0002; E05B 65/00; E05B 2047/0058; E05B 2047/0073; E05B 2047/0095; E05C 17/24; G06V 40/12
See application file for complete search history.

(56) References Cited

U.S. PATENT DOCUMENTS

| | | | | |
|---|---|---|---|---|
| 2015/0109112 | A1 | 4/2015 | Fadell et al. | |
| 2015/0109128 | A1 | 4/2015 | Fadell et al. | |
| 2015/0156031 | A1 | 6/2015 | Fadell et al. | |
| 2016/0364009 | A1* | 12/2016 | Lemberger | H04N 21/4424 |
| 2019/0357372 | A1* | 11/2019 | Lee | H05K 5/03 |
| 2020/0126376 | A1* | 4/2020 | Chen | G08B 13/02 |
| 2022/0270449 | A1* | 8/2022 | Thorne | F16M 11/00 |

* cited by examiner

*Primary Examiner* — Mark A Williams
(74) *Attorney, Agent, or Firm* — Hemisphere Law, PLLC

(57) ABSTRACT

The present disclosure discloses a portable dismantling structure for a smart doorbell, including a doorbell main body; the doorbell main body is provided with a front shell and a cover plate; the front shell is provided with a main control panel and an unlock mechanism; the main control panel is connected to the unlock mechanism in a control manner; the unlock mechanism is provided with a first elastic clasp; and the cover plate is provided with a second elastic clasp matched with the first elastic clasp. To achieve locking, the second elastic clasp of the cover plate is pushed into the front shell to fasten the second elastic clasp with the first elastic clasp to achieve fastened locking of the cover plate and the front shell.

15 Claims, 9 Drawing Sheets

PORTABLE DISMANTLING STRUCTURE FOR SMART DOORBELL

TECHNICAL FIELD

The present disclosure relates to the field of doorbells, in particular to a portable dismantling structure for a smart doorbell.

BACKGROUND

Smart doorbells have been widely used in modern commercial houses and old-fashioned residential houses. People usually cannot see visitors through original doorbells for the old-fashioned residential houses, but with smart doorbells (video doorbells), people can see visitors and open the doors. Specifically, upon hearing the bell, a user answers a call from a main unit at a downstairs entrance and talks to a visitor, like answering a video call. At the same time, a video extension in the house of the user can receive video images through a camera of the downstairs main unit. The user observes monitored images displayed on an extension screen to confirm who the visitor is, and finally decides whether to press an unlock button on the indoor extension to unlock an electrically controlled door lock connected to the main unit at the entrance, to allow the visitor to open the door and enter.

However, there are still some shortcomings in the existing smart doorbells. Specifically, the existing smart doorbells are disassembled in a traditional mechanical way, that is, using an ejector pin to push a spring, a screwdriver, or another too to dismantle a smart doorbell. This dismantling method is labor-intensive and time-consuming. Furthermore, because of a small size, the ejector pin is inconvenient to save and easy to lose.

Therefore, it is necessary to study a new technical solution to solve the above problems.

SUMMARY

In order to solve the defects and shortcomings in the prior art, the present disclosure provides a portable dismantling structure for a smart doorbell. An unlock mechanism is arranged in a doorbell main body, and a main control panel is used to control the unlock mechanism, thereby achieving an objective of automatically dismantling a doorbell, solving the problems that the existing doorbell is dismantled with a dismantling tool and time and labor are wasted, and achieving automation of dismantling.

In order to achieve the above-mentioned objective, the present disclosure adopts the following technical solution:

A portable dismantling structure for a smart doorbell includes a doorbell main body, wherein the doorbell main body is provided with a front shell and a cover plate connected to a rear side of the front shell; the front shell is provided with a main control panel and an unlock mechanism; the main control panel is connected to the unlock mechanism in a control manner; the main control panel is electrically connected with a power supply; the unlock mechanism is provided with a first elastic clasp;

the cover plate is provided with a second elastic clasp matched with the first elastic clasp; to achieve locking, the second elastic clasp of the cover plate is pushed into the front shell to fasten the second elastic clasp with the first elastic clasp to achieve fastened locking of the cover plate and the front shell; and to achieve unlocking, the unlock mechanism actuates the first elastic clasp to be separated from the second elastic clasp to complete unlocking, thereby achieving separation of the cover plate from the front shell.

As a preferred solution, the unlock mechanism is provided with an actuator; and the actuator is an electromagnetic valve or a motor (and a drive structure connected to the motor).

As a preferred solution, the front shell is provided with a battery compartment; the battery compartment is detachably connected with a compartment cover; and the cover plate is located behind the compartment cover.

As a preferred solution, the main control panel is provided with a signal receiving module configured to receiving an unlock signal.

As a preferred solution, the signal receiving module includes more than one of a wireless receiving unit, a voice receiving unit, a video receiving unit, and a fingerprint receiving unit.

Compared with the prior art, the present disclosure has significant advantages and beneficial effects. Specifically, first, according to the above technical solution, the unlock mechanism is arranged in the doorbell main body, and the main control panel is used to control the unlock mechanism, thereby achieving an objective of automatically dismantling a doorbell, solving the problems that the existing doorbell is dismantled with a dismantling tool and time and labor are wasted, and achieving automation of dismantling.

In order to describe the structural features and effects of the present disclosure more clearly, the present disclosure is described in detail below in combination with the accompanying drawings and specific embodiments.

NUMERALS IN THE DRAWINGS

10: doorbell main body; 11: front shell; 111: main control panel; 112: unlock mechanism; 113: first elastic clasp; 1131: reset spring; 114: battery compartment; 115: compartment cover; 12: cover plate; 121: second elastic clasp; 13: battery; 20: angle adjustment support assembly.

DETAILED DESCRIPTION OF THE EMBODIMENTS

The technical solutions in the embodiments of the present disclosure will be clearly and completely described below in conjunction with the accompanying drawings. Apparently, the described embodiments are only preferred embodiments of the present disclosure.

It should be noted that when an element is referred to as being "fixed" to another element, it can be directly on the other element or an intermediate element may also exist. When one element is considered to be "connected" to another element, it can be directly connected to another element or there may be a central element at the same time. The terms "perpendicular", "horizontal", "left", "right" and similar expressions used herein are for illustrative purposes only, and are not meant to be the only implementation modes.

Unless otherwise defined, all technical and scientific terms used herein are the same as meanings of general understandings of those skilled in the art of the present disclosure. The terms used in the description of the present disclosure herein are merely to describe the specific implementation modes, not intended to limit the present disclosure. The term "and/or" used herein includes any and all combinations of one or more related listed items.

Figure 1:
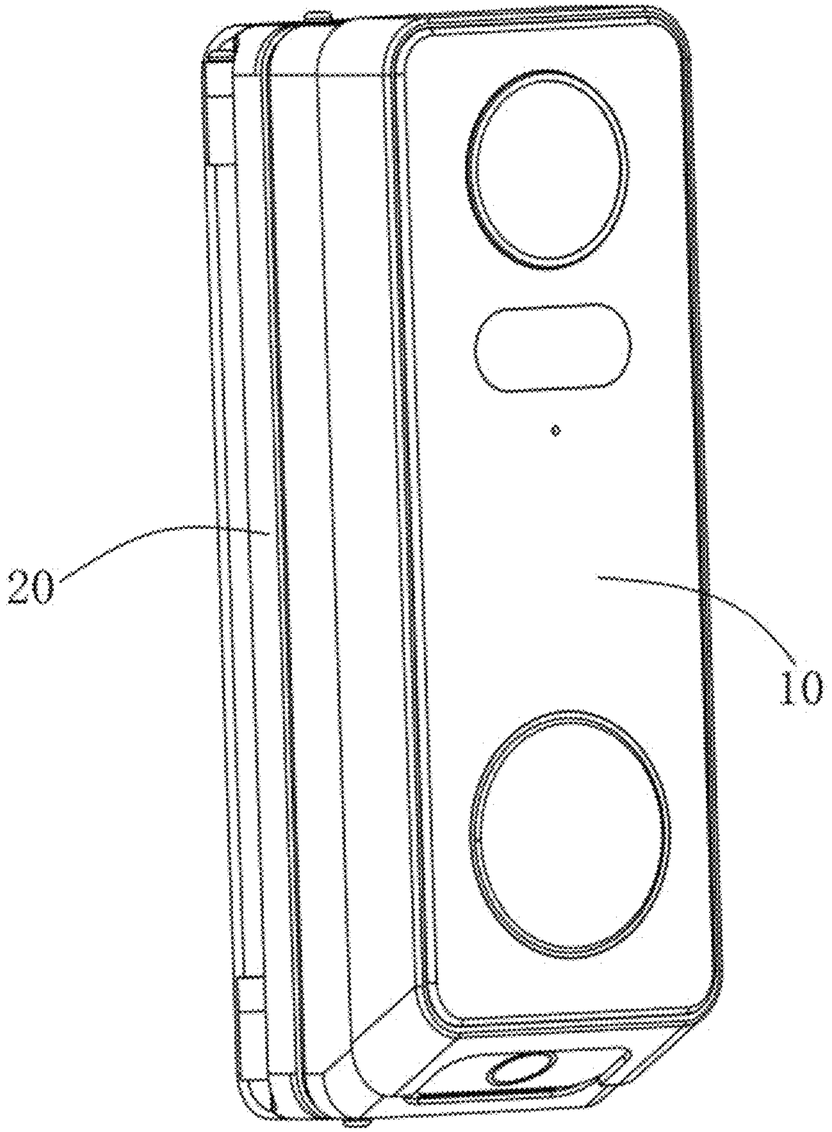
FIG. 1 is a schematic three-dimensional diagram of Embodiment I of the present disclosure.
Figure 2:
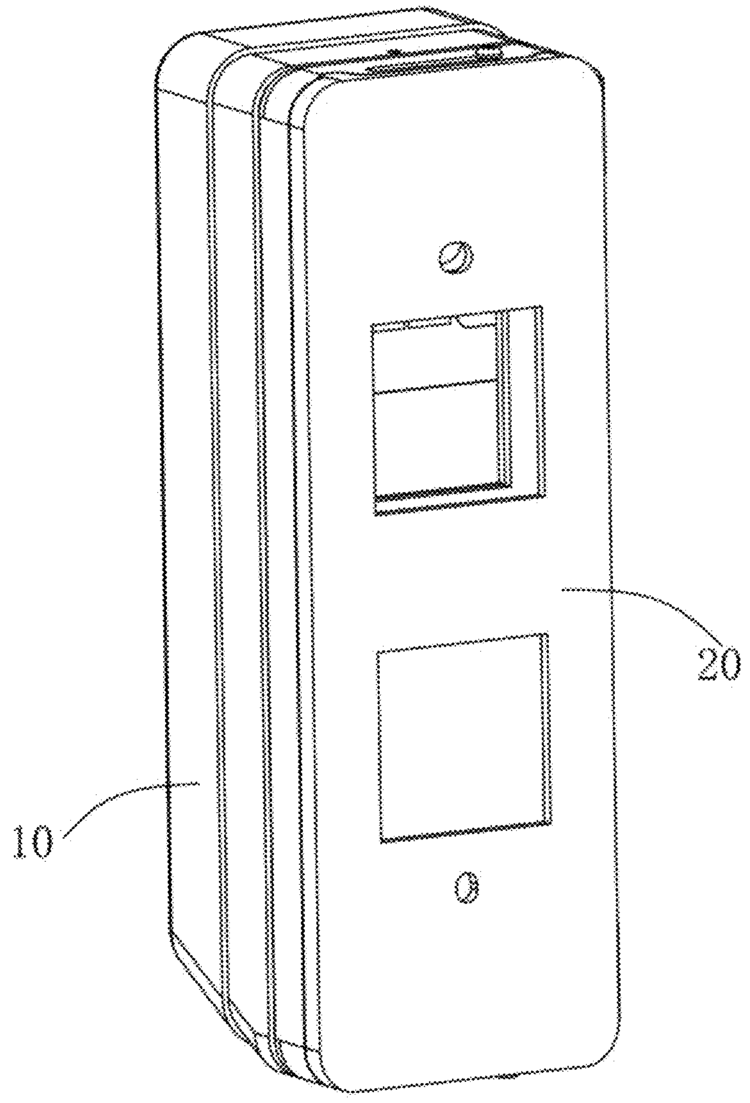
FIG. 2 is a schematic three-dimensional diagram of Embodiment I of the present disclosure in another view.
Figure 3:
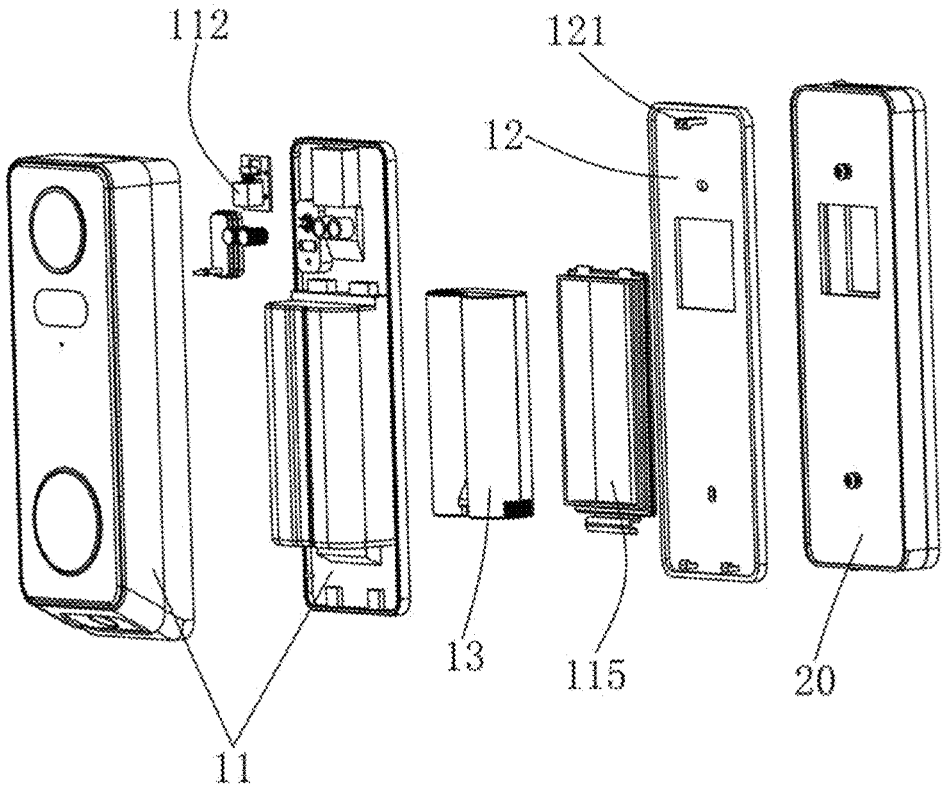
FIG. 3 is a first exploded diagram of Embodiment I of the present disclosure.
Figure 4:
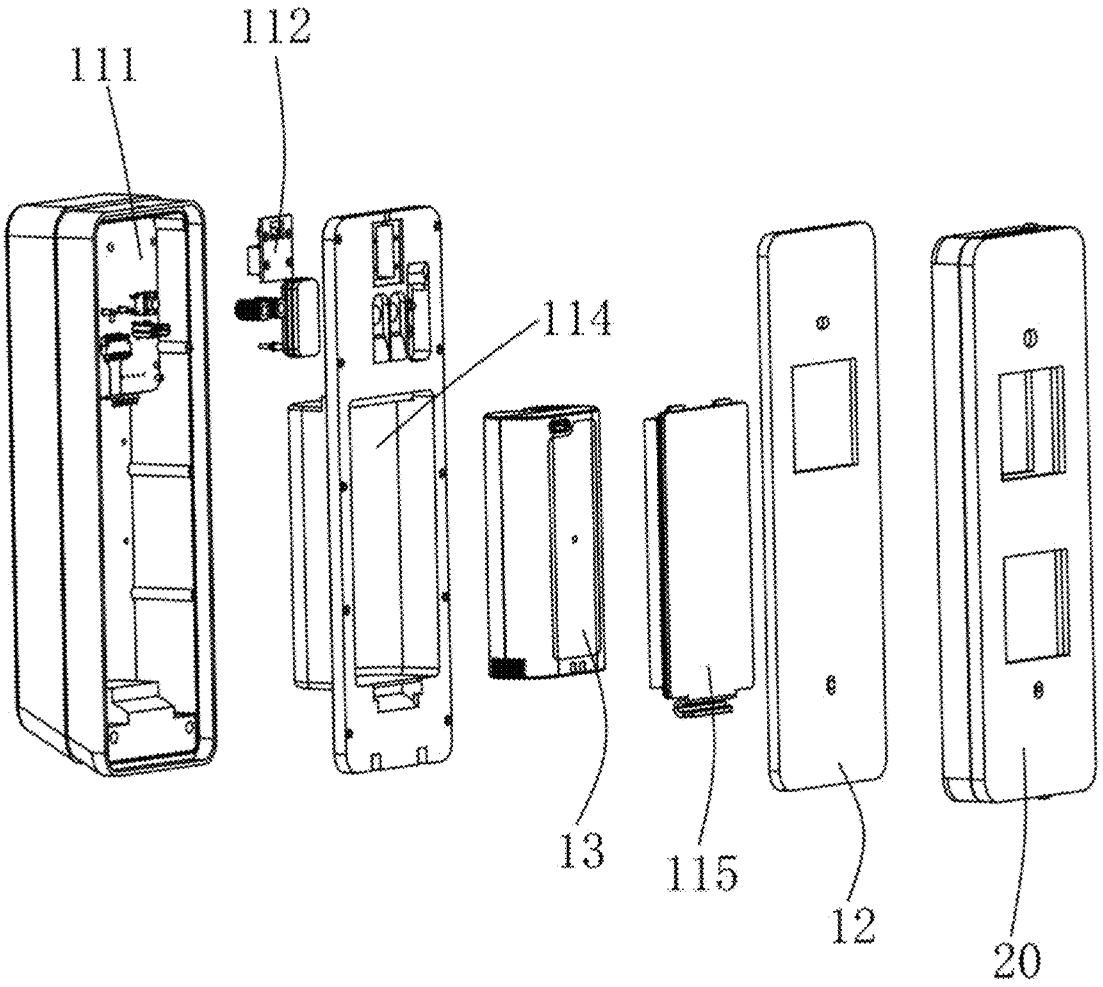
FIG. 4 is a second exploded diagram of Embodiment I of the present disclosure.
Figure 5:
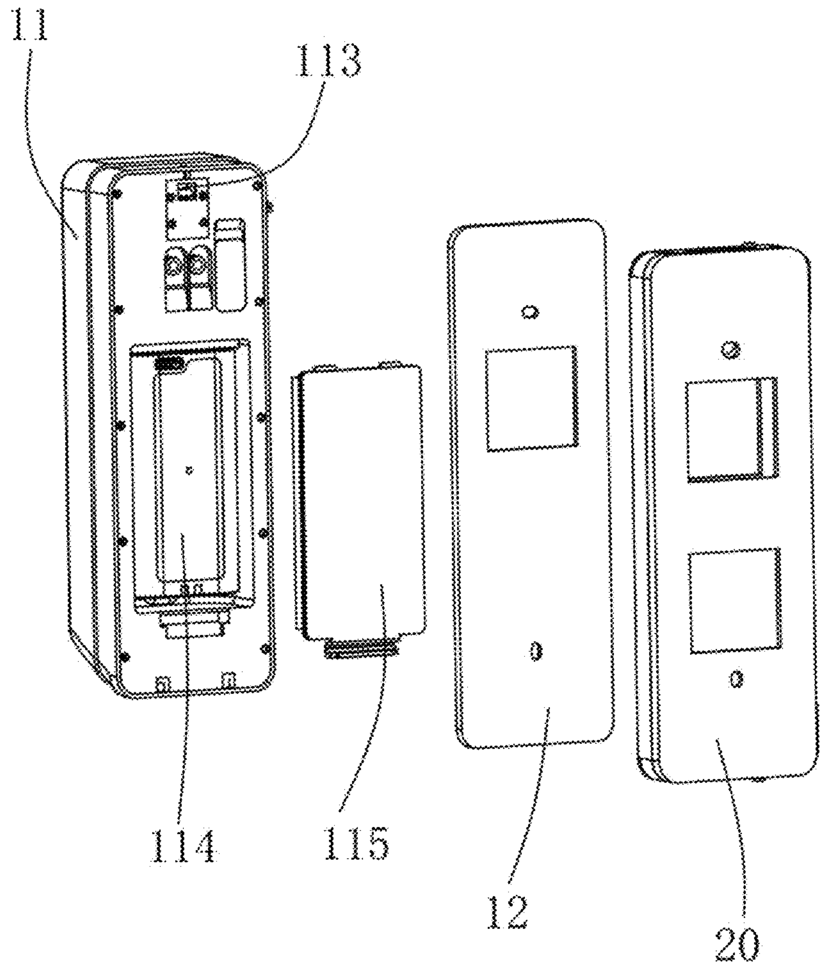
FIG. 5 is a third exploded diagram of Embodiment I of the present disclosure.
Figure 6:
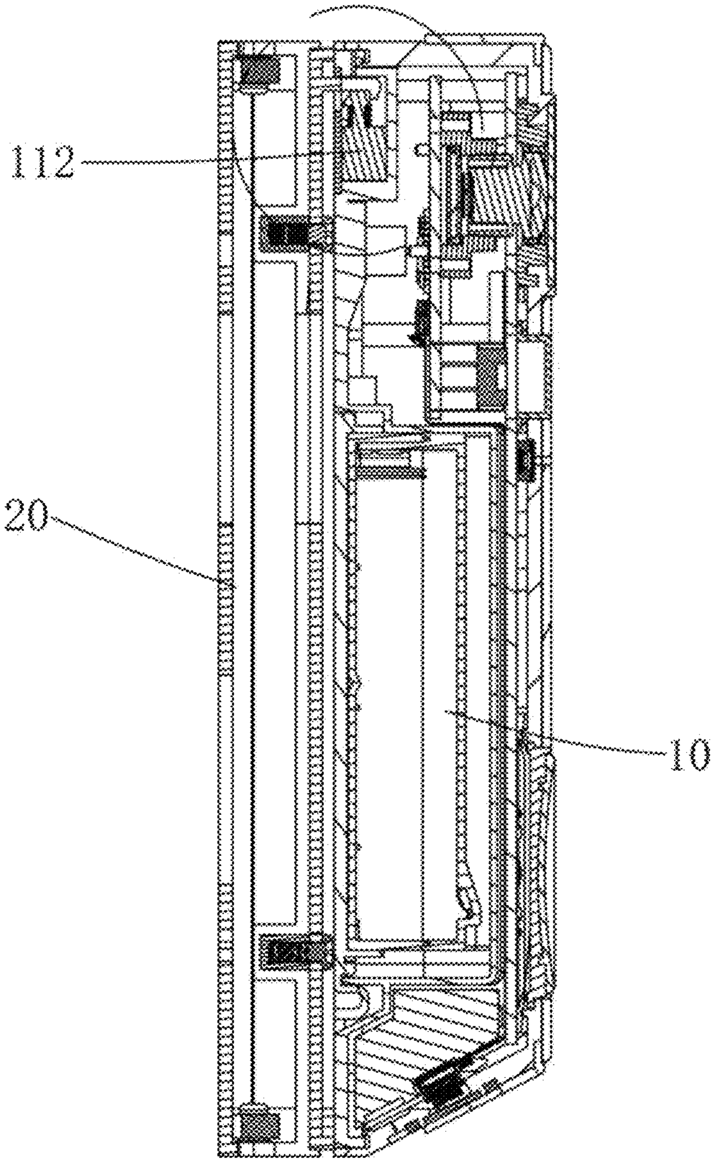
FIG. 6 is a schematic sectional diagram of Embodiment I of the present disclosure.
Figure 7:
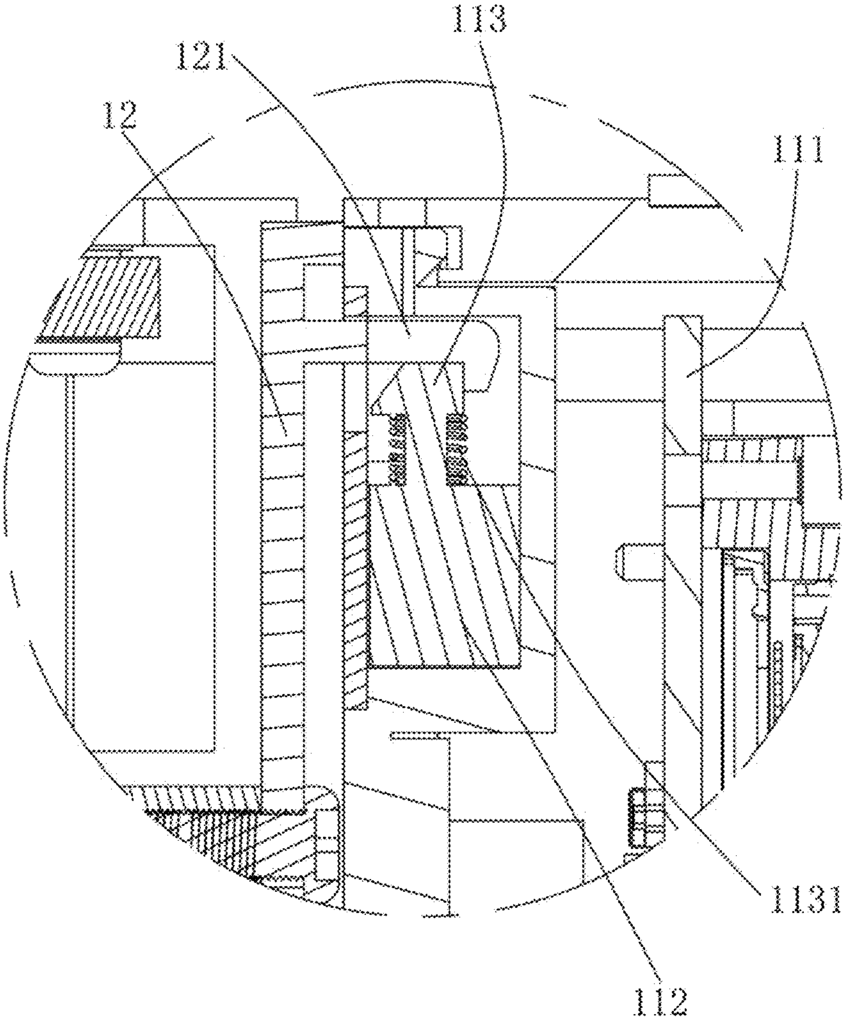
FIG. 7 is a partially enlarged diagram of FIG. 6.
Figure 8:
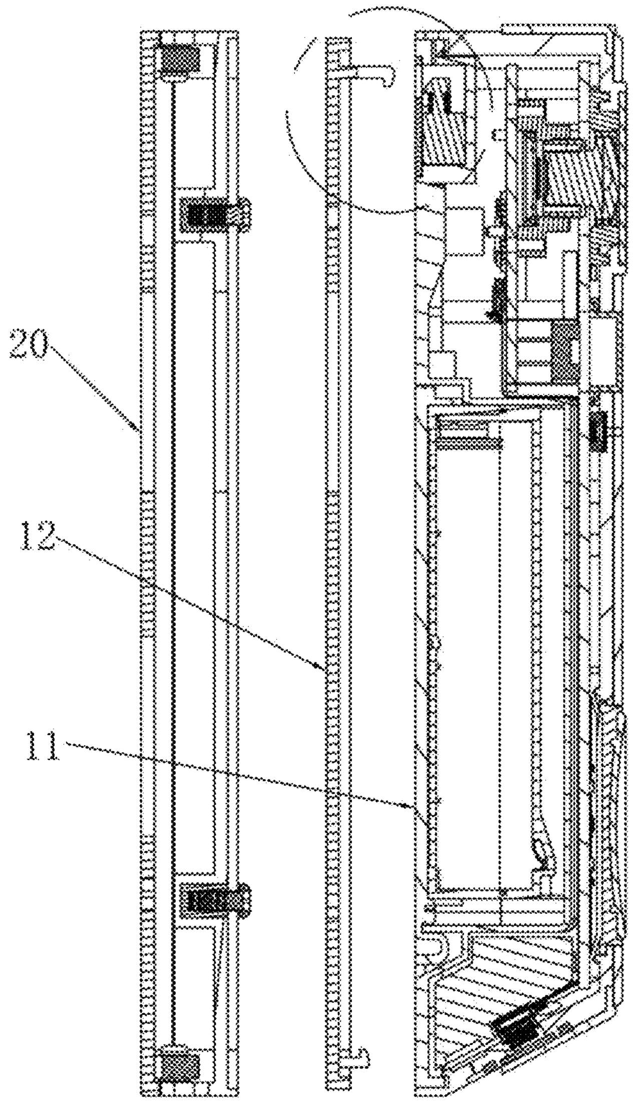
FIG. 8 is a sectionally exploded diagram of Embodiment I of the present disclosure.
Figure 9:
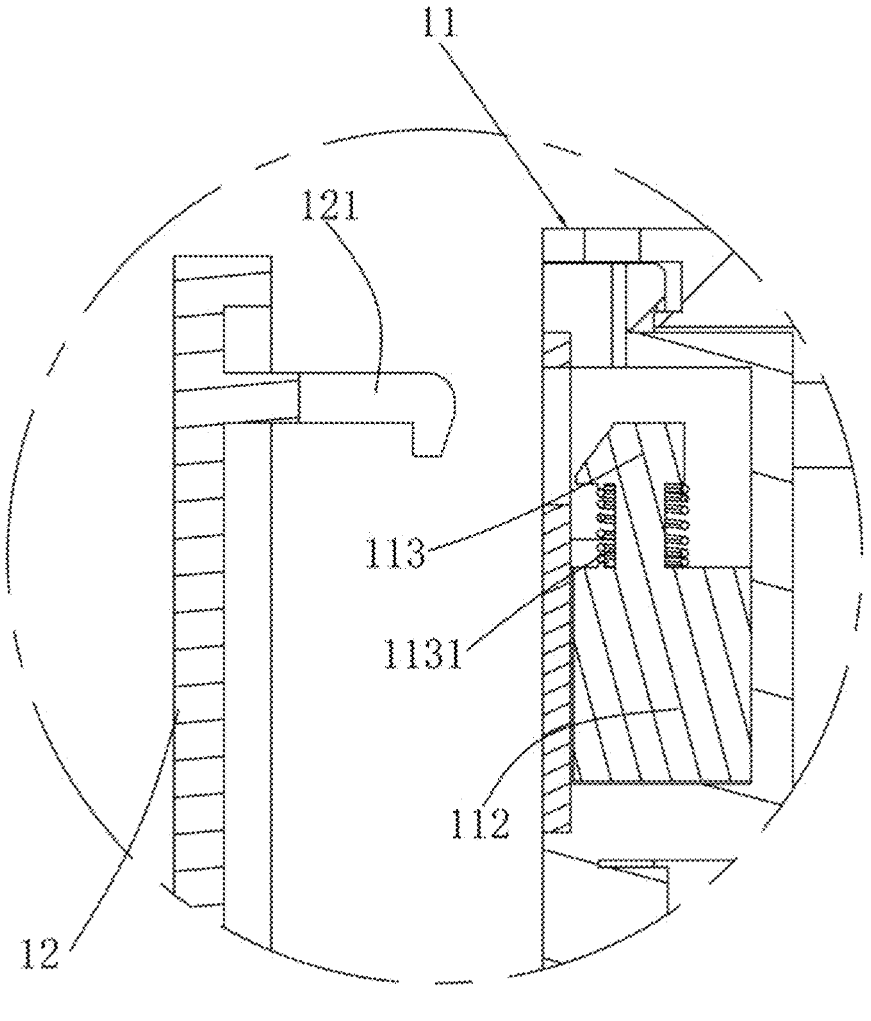
FIG. 9 is a partially enlarged diagram of FIG. 8.

Referring to FIG. 1 to FIG. 13, a portable dismantling structure for a smart doorbell, including a doorbell main body 10. The doorbell main body 10 is provided with a front shell 11 and a cover plate 12 connected to a rear side of the front shell 11. The front shell 11 is provided with a main control panel 111, an unlock mechanism 112, and a battery 13. The main control panel 111 is connected to the unlock mechanism 112 in a control manner. The unlock mechanism 112 is provided with a first elastic clasp 113. The main control panel 111 is electrically connected with the battery 13 (a power supply).

The cover plate 12 is provided with a second elastic clasp 121 matched with the first elastic clasp 113. To achieve locking, the second elastic clasp 121 of the cover plate 12 is pushed into the front shell 11 to fasten the second elastic clasp 121 with the first elastic clasp 113 to achieve fastened locking of the cover plate 12 and the front shell 11.

to achieve unlocking, the unlock mechanism 112 actuates the first elastic clasp 113 to be separated from the second elastic clasp 121 to complete unlocking, thereby achieving separation of the cover plate 12 from the front shell 11.

In this way, the main control panel 111 controls the unlock mechanism 112, which achieves automatic unlocking, and solves the problems that a tool (such as an ejector pin or a screwdriver) is required in traditional dismantling and time and labor are wasted. Specifically, a battery compartment 114 used for placing the battery 13 is arranged on the front shell 11. The battery compartment 114 is detachably (usually by using a fastener structure) connected with a compartment cover 115. The cover plate 12 is located behind the compartment cover 115. In this way, the battery can be replaced or charged as long as the main control panel 111 controls the cover plate 12 to be separated and the compartment cover 115 is removed. It should be noted that what is described herein is that the dismantling structure of the present disclosure is not limited to being applied to a smart doorbell with a battery 13, but this dismantling structure can be also applied to a smart doorbell with an unremovable battery.

Specifically, the unlock mechanism 112 is provided with an actuator which can be an electromagnetic valve. The main control panel 111 is connected with the electromagnetic valve in a control manner. The electromagnetic valve actuates the first elastic clasp 113. A reset spring 1131 for actuating the first elastic clasp 113 to be reset upward is arranged at a lower end of the first elastic clasp 113. Specifically, referring to FIG. 6 to FIG. 9, when the cover plate 12 is closed, the front shell 11 is pushed backward, and the first elastic clasp 113 moves down under the action of a thrust of the second elastic clasp 121. After the two elastic clasps are fastened, the first elastic clasp 113 is reset upward under a force of the reset spring 1131, to complete locking the cover plate 12.

To achieve unlocking, the electromagnetic valve actuates the first elastic clasp 113 to move down, so that the first elastic clasp 113 is separated from the second elastic clasp 121, and the cover plate 12 can be removed from the front shell 11, to complete dismantling of the doorbell main body and facilitate a user to replace the battery or perform maintenance and other operations. Of course, the unlock mechanism 112 can also be a motor and a drive structure of the motor, or other mechanisms. That is, any unlock mechanism 112 is regarded to fall within the protection scope of the present disclosure as long as it achieves automatic control of the first elastic clasp 113.

Further, the main control panel 111 includes a signal receiving module configured to receiving an unlock signal. The signal receiving module includes more than one of a wireless receiving unit, a voice receiving unit, a video receiving unit, and a fingerprint receiving unit. Specifically, the signal receiving module achieves communication connection with a mobile phone (or a watch, or another electronic product) through the wireless receiving unit, so that an unlock instruction can be sent to the main control panel 111 through a mobile phone app or other operations, to complete the dismantling of the doorbell, which is very convenient. Of course, the user can also achieve unlocking with a voice (command) through the voice receiving unit, or can achieve unlocking with a fingerprint through the fingerprint receiving unit, or the like. It should be added that the doorbell main body 10 may be a video doorbell, namely, the main control panel 111 also includes a camera module.

The key point of design of the present disclosure is as follows: First, the unlock mechanism is arranged in the doorbell main body, and the main control panel is used to control the unlock mechanism, thereby achieving an objective of automatically dismantling a doorbell, solving the problems that the existing doorbell is dismantled with a dismantling tool and time and labor are wasted, and achieving automation of dismantling.

The above descriptions are only preferred embodiments of the present disclosure, and do not limit the technical scope of the present disclosure. Therefore, any minor changes, equivalent changes and modifications made to the above embodiments according to the technical essence of the present disclosure still fall within the scope of the technical solutions of the present disclosure.

What is claimed is:

1. A portable dismantling structure for a smart doorbell, the portable dismantling structure comprising a doorbell main body, wherein the doorbell main body is provided with a front shell and a cover plate connected to a rear side of the front shell; the front shell is provided with a main control panel and an unlock mechanism; the main control panel is electrically connected with a power supply; the unlock mechanism is provided with a first elastic clasp;

the cover plate is provided with a second elastic clasp matched with the first elastic clasp; to achieve locking, the second elastic clasp of the cover plate is pushed into the front shell to fasten the second elastic clasp with the first elastic clasp to achieve fastened locking of the cover plate and the front shell; and to achieve unlocking, the first elastic clasp is separated from the second elastic clasp to complete unlocking, thereby achieving separation of the cover plate from the front shell.

2. The portable dismantling structure for the smart doorbell according to claim 1, wherein the unlock mechanism is provided with an actuator; and the actuator is an electromagnetic valve or a motor (and a drive structure connected to the motor).

3. The portable dismantling structure for the smart doorbell according to claim 1, wherein the front shell is provided with a battery compartment; the battery compartment is detachably connected with a compartment cover; and the cover plate is located behind the compartment cover.

4. The portable dismantling structure for the smart doorbell according to claim 1, wherein the main control panel is provided with a signal receiving module configured to receiving an unlock signal.

5. The portable dismantling structure for the smart doorbell according to claim 4, wherein the signal receiving module comprises more than one of a wireless receiving unit, a voice receiving unit, a video receiving unit, and a fingerprint receiving unit.

6. The portable dismantling structure for the smart doorbell according to claim 1, wherein a rear side of the doorbell main body is further connected with an angle adjustment support assembly.

7. The portable dismantling structure for the smart doorbell according to claim 2, wherein a rear side of the doorbell main body is further connected with an angle adjustment support assembly.

8. The portable dismantling structure for the smart doorbell according to claim 3, wherein a rear side of the doorbell main body is further connected with an angle adjustment support assembly.

9. The portable dismantling structure for the smart doorbell according to claim 4, wherein a rear side of the doorbell main body is further connected with an angle adjustment support assembly.

10. The portable dismantling structure for the smart doorbell according to claim 5, wherein a rear side of the doorbell main body is further connected with an angle adjustment support assembly.

11. The portable dismantling structure for the smart doorbell according to claim 6, wherein the angle adjustment support assembly comprises a mounting plate, a push rod, and a connecting plate; the connecting plate is rotatably connected with the mounting plate; one end of the push rod is rotatably connected to the mounting plate; a lock screw is arranged at the other end of the push rod; the connecting plate is provided with a push slot corresponding to the lock screw; and the cover plate is detachably connected to the connecting plate.

12. The portable dismantling structure for the smart doorbell according to claim 7, wherein the angle adjustment support assembly comprises a mounting plate, a push rod, and a connecting plate; the connecting plate is rotatably connected with the mounting plate; one end of the push rod is rotatably connected to the mounting plate; a lock screw is arranged at the other end of the push rod; the connecting plate is provided with a push slot corresponding to the lock screw; and the cover plate is detachably connected to the connecting plate.

13. The portable dismantling structure for the smart doorbell according to claim 8, wherein the angle adjustment support assembly comprises a mounting plate, a push rod, and a connecting plate; the connecting plate is rotatably connected with the mounting plate; one end of the push rod is rotatably connected to the mounting plate; a lock screw is arranged at the other end of the push rod; the connecting plate is provided with a push slot corresponding to the lock screw; and the cover plate is detachably connected to the connecting plate.

14. The portable dismantling structure for the smart doorbell according to claim 9, wherein the angle adjustment support assembly comprises a mounting plate, a push rod, and a connecting plate; the connecting plate is rotatably connected with the mounting plate; one end of the push rod is rotatably connected to the mounting plate; a lock screw is arranged at the other end of the push rod; the connecting plate is provided with a push slot corresponding to the lock screw; and the cover plate is detachably connected to the connecting plate.

15. The portable dismantling structure for the smart doorbell according to claim 10, wherein the angle adjustment support assembly comprises a mounting plate, a push rod, and a connecting plate; the connecting plate is rotatably connected with the mounting plate; one end of the push rod is rotatably connected to the mounting plate; a lock screw is arranged at the other end of the push rod; the connecting plate is provided with a push slot corresponding to the lock screw; and the cover plate is detachably connected to the connecting plate.

* * * * *